United States Patent
Haberkamp et al.

(10) Patent No.: US 10,046,630 B2
(45) Date of Patent: Aug. 14, 2018

(54) SOFT FRONT COCKPIT COVER

(71) Applicant: Bestop, Inc., Louisville, CO (US)

(72) Inventors: William H. Haberkamp, Rochester Hills, MI (US); George C. Stickles, Thornton, CO (US); Duane C. Junkin, Madison Heights, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

(21) Appl. No.: 15/344,140

(22) Filed: Nov. 4, 2016

(65) Prior Publication Data

US 2017/0072776 A1  Mar. 16, 2017

Related U.S. Application Data

(63) Continuation of application No. 14/808,011, filed on Jul. 24, 2015, now Pat. No. 9,517,684, which is a continuation of application No. 14/243,359, filed on Apr. 2, 2014, now Pat. No. 9,139,073.

(60) Provisional application No. 61/807,506, filed on Apr. 2, 2013.

(51) Int. Cl.
  B60J 7/12 (2006.01)

(52) U.S. Cl.
  CPC .................... B60J 7/1291 (2013.01)

(58) Field of Classification Search
  CPC ..... B60J 7/08; B60J 7/12; B60J 7/0053; B60J 7/1291
  USPC ................ 296/216.02–216.03, 219
  See application file for complete search history.

(56) References Cited

U.S. PATENT DOCUMENTS

| 3,819,227 A | 6/1974 | Carli |
| 5,299,850 A * | 4/1994 | Kaneko ............... B60J 7/1265 |
| | | 296/107.13 |
| 6,206,450 B1 | 3/2001 | Ide et al. |
| 6,309,007 B1 * | 10/2001 | Essig .................. B60J 7/106 |
| | | 296/102 |

(Continued)

FOREIGN PATENT DOCUMENTS

| BE | 350 963 A | 4/1928 |
| DE | 101 02 643 A1 | 7/2002 |

(Continued)

OTHER PUBLICATIONS

Extended European Search Report for Application No. EP 16 18 5007, dated Jan. 3, 2017.

(Continued)

*Primary Examiner* — Dennis H Pedder
(74) *Attorney, Agent, or Firm* — Warn Partners, P.C.

(57) ABSTRACT

A foldable roof assembly having a soft panel top assembly for a vehicle in sealing engagement with a hard top portion of a roof. The soft panel top assembly has a fixed portion attached to the vehicle and a lightweight pivotal portion that folds back to provide the occupant a quick and easy open air effect. Two door rails of the soft panel top assembly are connected to the vehicle. Two side bows are attached to a first bow member, which is secured to a windshield frame when in a closed position, and are connected at a pivot point created with a bracket attached to the door rails to allow the pivotal portion to pivot to an open position. The soft panel top assembly includes a rear header that is a wireframe and engages with seals in the hard top roof portion to provide a weatherproof seal.

19 Claims, 7 Drawing Sheets

(56) References Cited

U.S. PATENT DOCUMENTS

| | | |
|---|---|---|
| 6,409,247 B1 | 6/2002 | Maass |
| 9,346,342 B1 | 5/2016 | Bowles |
| 2001/0030443 A1 | 10/2001 | Barker |
| 2004/0108747 A1 | 6/2004 | Obendiek |
| 2004/0130188 A1* | 7/2004 | Stevens ............... B60J 7/10 296/218 |
| 2012/0098292 A1 | 4/2012 | Langan |
| 2012/0286540 A1 | 11/2012 | Moran |
| 2014/0103682 A1 | 4/2014 | Lewis et al. |
| 2014/0138983 A1 | 5/2014 | Haberkamp et al. |
| 2014/0300143 A1 | 10/2014 | Haberkamp et al. |
| 2015/0123422 A1 | 5/2015 | Bennett et al. |

FOREIGN PATENT DOCUMENTS

| | | |
|---|---|---|
| EP | 1634748 A2 | 3/2006 |
| FR | 2745778 A1 | 9/1997 |
| FR | 2937591 A1 | 4/2010 |
| GB | 296586 A | 9/1928 |
| GB | 311 081 A | 5/1929 |
| GB | 336 514 A | 10/1930 |
| WO | 2004/056596 A2 | 7/2004 |

OTHER PUBLICATIONS

International Search Report for International Application No. PCT/US2015/022716, dated Jun. 12, 2015.

* cited by examiner

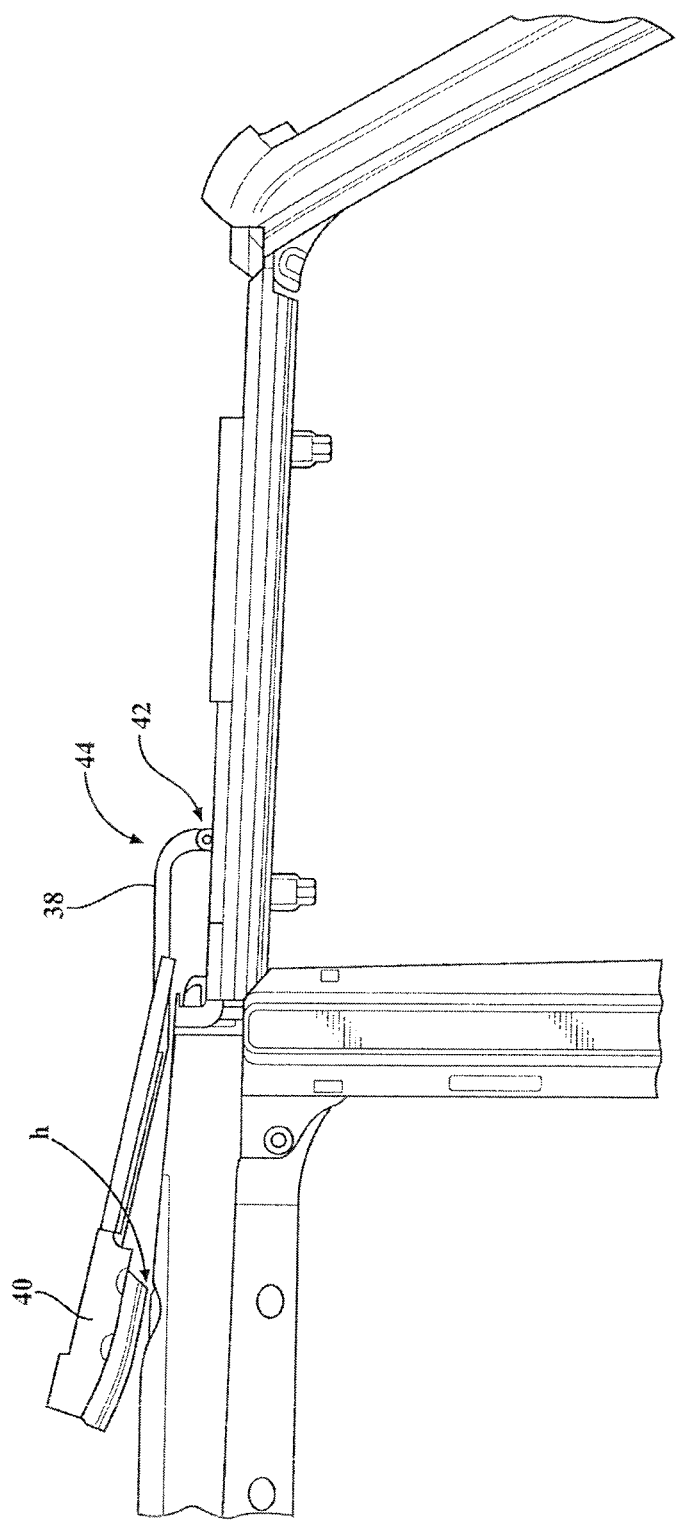

SOFT FRONT COCKPIT COVER

CROSS-REFERENCE TO RELATED APPLICATIONS

This application is a continuation of U.S. patent application Ser. No. 14/808,011, filed Jul. 24, 2015, which is a continuation of U.S. patent application Ser. No. 14/243,359, filed Apr. 2, 2014, issued as U.S. Pat. No. 9,139,073 on Sep. 22, 2015, which claims the benefit of U.S. Provisional Application No. 61/807,506, filed Apr. 2, 2013. The disclosures of the above applications are incorporated herein by reference.

FIELD OF THE INVENTION

The present invention relates to a foldable roof assembly having a soft panel top cover that seals against a hard top portion of the roof.

BACKGROUND OF THE INVENTION

Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must be stored, which is often difficult because of the size of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels cannot be quickly put back in place.

Accordingly, there exists a need for a more manageable and easily foldable top made of soft material to provide a top that can be opened quickly to provide what is often referred to as an open air feel, where a portion of the top of the roof is moved from a closed or deployed position to an open or stowed position exposing a portion of the inside vehicle cockpit/passenger compartment to the outside without removing the top.

SUMMARY OF THE INVENTION

The present invention is directed to a foldable roof assembly having a soft panel top assembly that is in sealing engagement with a hard top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft panel top assembly has two door rails connected to side sport bars of the vehicle providing a sealing surface for the doors of the vehicle as well as pivot points for the pivotal portion of the soft panel top assembly. The soft panel top assembly has two side bows connected to a first bow member that is secured to a windshield frame with quick release latches. The side bows are connected at a second end to a fixed bracket connected to the side rails creating the pivot points with the use of the brackets. The soft panel top assembly includes a rear header that is a rear wireframe closeout for sealing engagement with seals of the hard top roof portion. The soft panel top assembly is made lightweight by using the wireframe rear header and by using minimal frame and mostly soft goods. This further helps with ease of installation and ease of cycle efforts of the pivotal portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a right side elevation view of the soft panel top cover assembly in an open position, without the soft cover depicted for clarity, in accordance with the present invention;

DETAILED DESCRIPTION OF THE PREFERRED EMBODIMENTS

Figure 1:
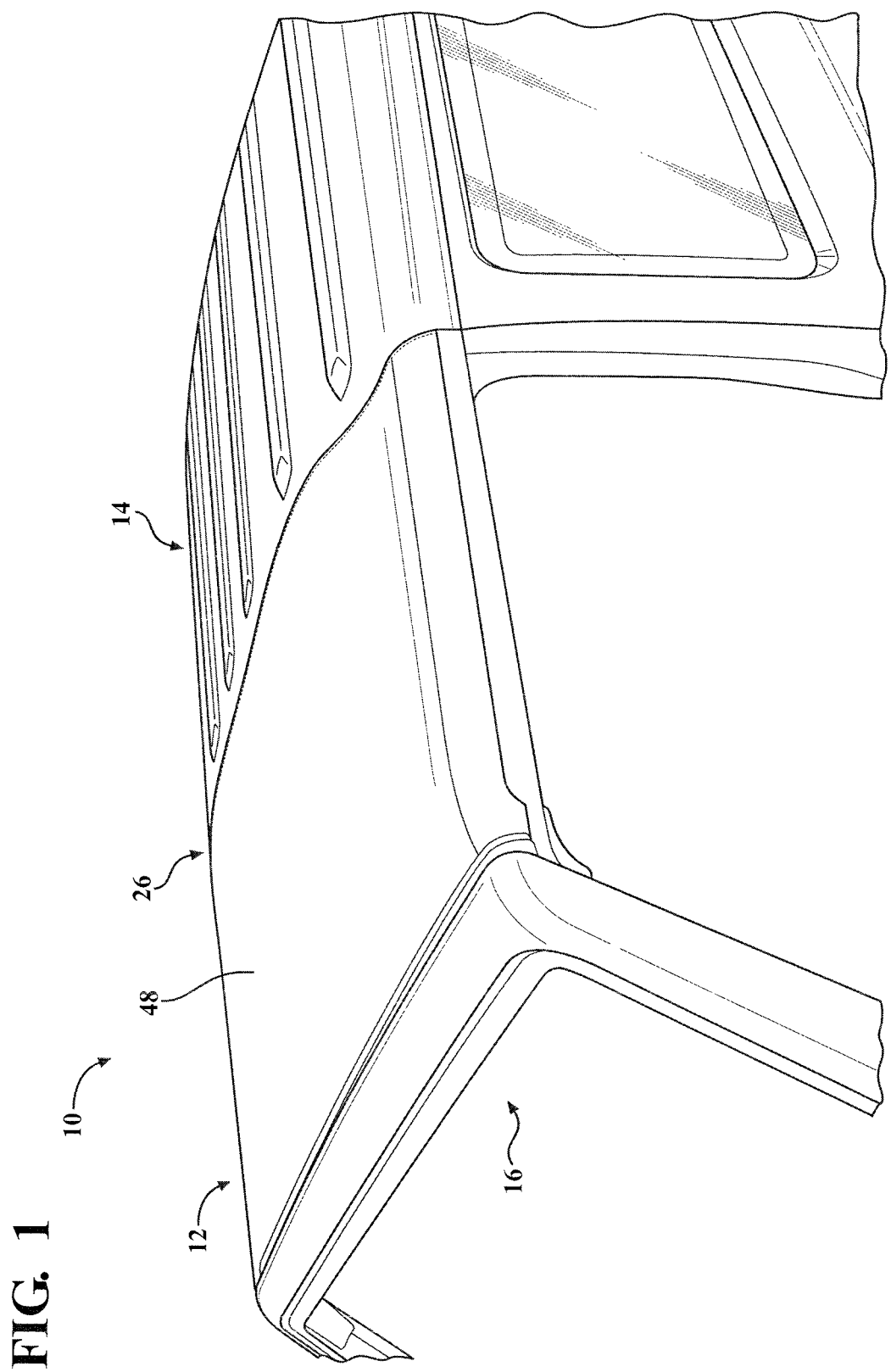
FIG. 1 is a front left perspective view of a foldable roof assembly having a soft panel top cover assembly in a deployed position connected to the vehicle and in sealing engagement with a hard top portion, in accordance with the present invention.
Figure 2:
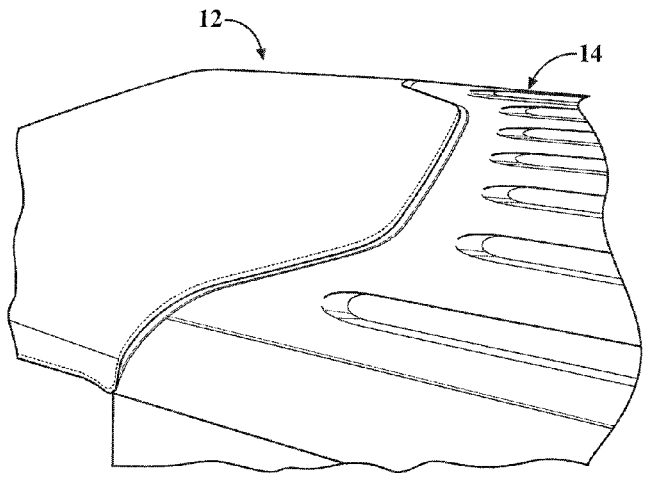
FIG. 2 is a rear left perspective view of the foldable roof assembly having the soft panel top cover assembly in the deployed position, in accordance with the present invention.
Figure 3:
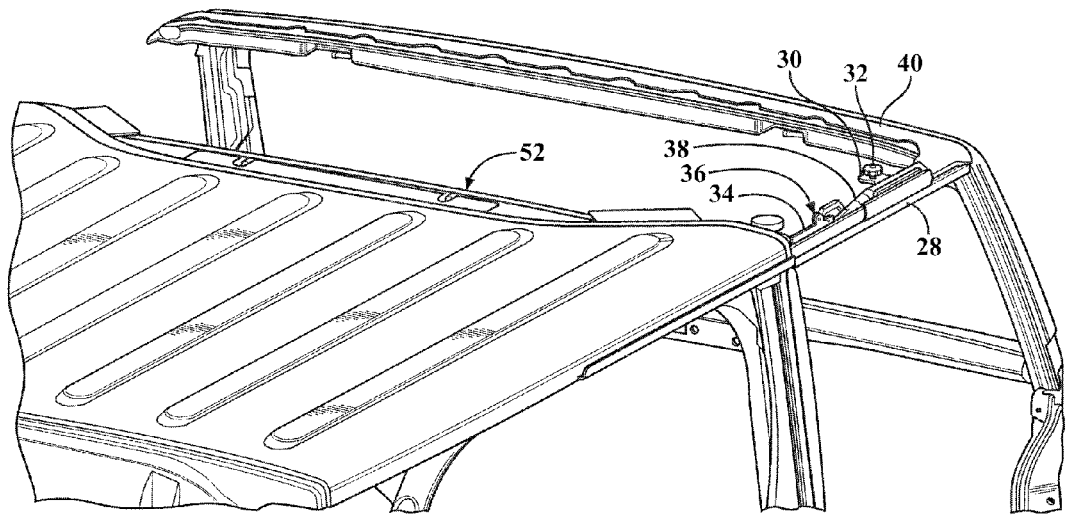
FIG. 3 is a rear right perspective view of the soft panel top cover assembly in the deployed position, without the soft cover depicted for clarity, in accordance with the present invention.

The following description of the preferred embodiment(s) is merely exemplary in nature and is in no way intended to limit the invention, its application, or uses.

Referring generally to FIGS. 1-10, there is provided a foldable roof assembly, generally shown at 10, having a soft panel top assembly, generally shown at 12, sealable with a hard top roof portion, generally shown at 14. The soft panel top assembly 12 is connected to a vehicle 16. The vehicle 16 includes a windshield frame 18 with side members 20 extending therefrom and a crossmember 22 connecting the side members 20 substantially adjacent the rear of the driver/passenger compartment.

The soft panel top assembly 12 folds back to give the occupant a quick and easy open air effect, e.g., lightweight and easily operated at a short interval stop, without completely removing the soft panel top assembly 12 from the vehicle 16. Folding the soft panel top assembly 12 between a closed position and an open position is also achievable without the occupant needing to leave the vehicle and eliminates removal and storage of roof panels from the vehicle. Once cycled to the open position, the soft panel top assembly 12 also does not require strapping the assembly down to maintain open air positioning.

The soft panel top assembly 12 has a pivotal portion, shown generally at 24, for pivoting the soft panel top assembly 12 between the deployed or closed position and open position. When the soft panel top assembly 12 is cycled between the closed/open position, the soft panel top assembly 12 is in sealing engagement with the hard top roof portion 14 at a sealing portion, generally shown at 26. When the soft panel top assembly 12 is in the closed position, the soft panel top assembly 12 seals with the vehicle windshield frame 18, doors and/or the side members 20, and the hard top roof portion 14 at sealing portion 26.

The soft panel top assembly 12 has two door rails 28 connected to side members of the vehicle 16. The door rails 28 provide a sealing surface for the driver/passenger doors of the vehicle 16 as well as pivot points for the pivotal portion 24 of the soft panel top assembly 12. Each door rail 28 has two pairs of clamping surfaces 30, each with an upper surface extending inwardly over the top of the side member and a bottom surface extending under the bottom of the side member for attaching to the vehicle 16 using at least two mushroom knob fasteners 32 extending through each pair of the clamping surfaces and side member. Each door rail 28 has a bracket 34 connected to the door rail 28 to provide the pivot points, generally shown at 36, for the pivotal portion 24 of the soft panel top assembly 12.

The pivotal portion 24 of the soft panel top assembly 12 has two side rails or bows 38 each connected at a first end to a respective end of a header or first bow member 40. The first bow 40 is adapted for releasable attachment to the windshield frame 18 for opening and closing the soft panel top assembly 12 of the foldable roof assembly 10. The first bow 40 has at least two latches connected thereto that have a hand actuated clamping arrangement to selectively connect to the windshield frame 18. The first bow 40 is preferably molded plastic with steel reinforcement on the bottom and comprises two latches, which when in the closed position are generally located under the visors of the vehicle, and when cycling to the open position, travel with the first bow 30. The latches provide for securing closure of the top to the windshield frame 18 and are readily released by an operator for opening of the soft panel top assembly 12.

The side rails 38 are connected toward the second end of the side rails 38 to the door rail pivot points 36 with the use of the brackets 34. A bushing and screw arrangement 42 provide for a pivotal connection between the brackets 34 fixed in place to the door rails 28 and the side rails 38 that freely pivot to allow the top to be cycled open or closed. The side rails 38 have a curved portion, generally shown at 44, to achieve the predetermined range of height needed for the first bow member 40 to lay above and near without touching the hard top portion 14 when in the open position. The curved portions 44 in combination with angled portions, generally shown at 46, at a predetermined angle provides a preferred predetermined clearance "h" to the hard top portion 14 to prevent scratches or damage. Preferably, a latch hook is additionally provided that functions as a stop that the side rails 38 hit to hold the first bow member off the surface of the hard top portion 14 to prevent scratches or damage.

The soft panel top assembly 12 has a soft skin or top cover 48 of fabric sewn into two extrusions 50 that are connected to the side rails 38. The cover 48 can wrap around the front of the first bow member 40 and is connected to the bow 30. The first bow member 40 provides additional mounting points for the cover 48 such as snaps for securing the cover 48 on the first bow member 40. The length of the side rails 38 in combination with the location of the pivot points 36 allows for moving the pivotal portion 24 to the open position without folding the fabric in a folded accordion like manner. The cover 48 is additionally connected to a rear header member, generally shown at 52. The rear header 52 has mounting provisions for snaps to mount the cover 48 to the rear header 52.

The rear header 52 is a wireframe that is a rear wireframe closeout that engages the seals 54, e.g., bulb seals, of the hard top portion 14 to provide a weatherproof seal. The rear header 52 has attachment brackets 56 for coupling to the vehicle and/or hard top cover portion 14. The rear header 52 is a bent wire frame welded together to generally match the shape of the hard top portion 14 and to seal against the seals 54 of the hard top portion 14.

Figure 4:
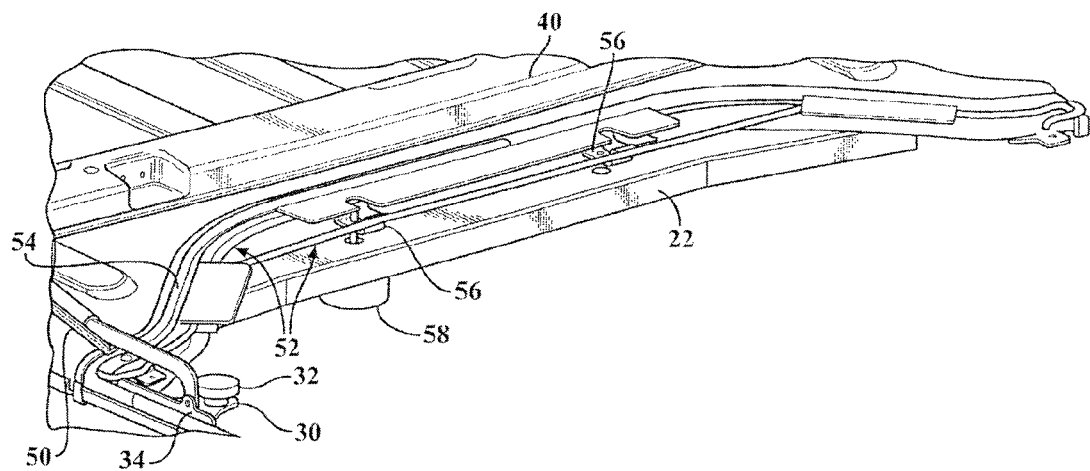
FIG. 4 is a front left perspective view of the soft panel top cover assembly in an open position, without the soft cover depicted for clarity, in accordance with the present invention.
Figure 5:
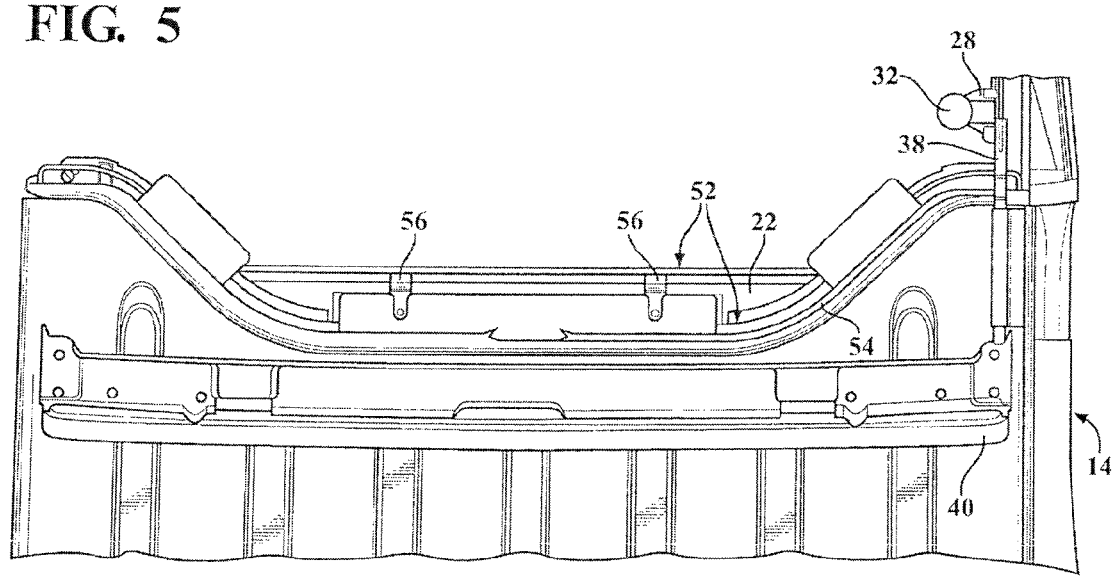
FIG. 5 is a top plan view of the soft panel top cover assembly in an open position, without the soft cover depicted for clarity, in accordance with the present invention.
Figure 6:
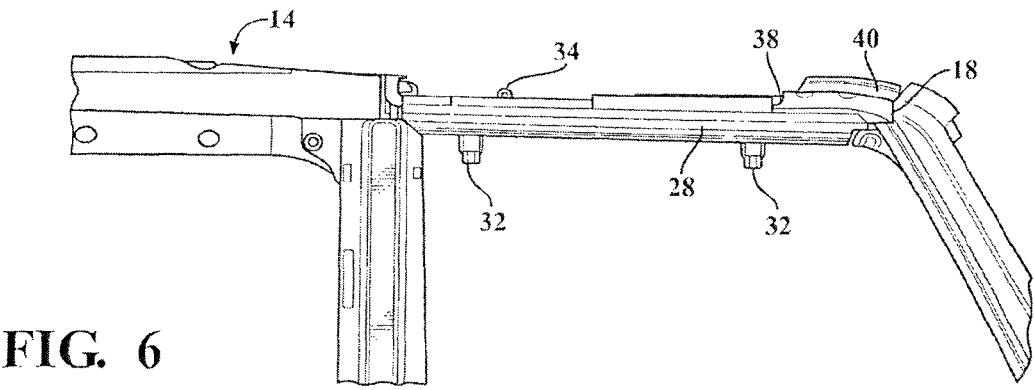
FIG. 6 is a right side elevation view of the soft panel top cover assembly in a closed position, without the soft cover depicted for clarity, in accordance with the present invention.
Figure 8:
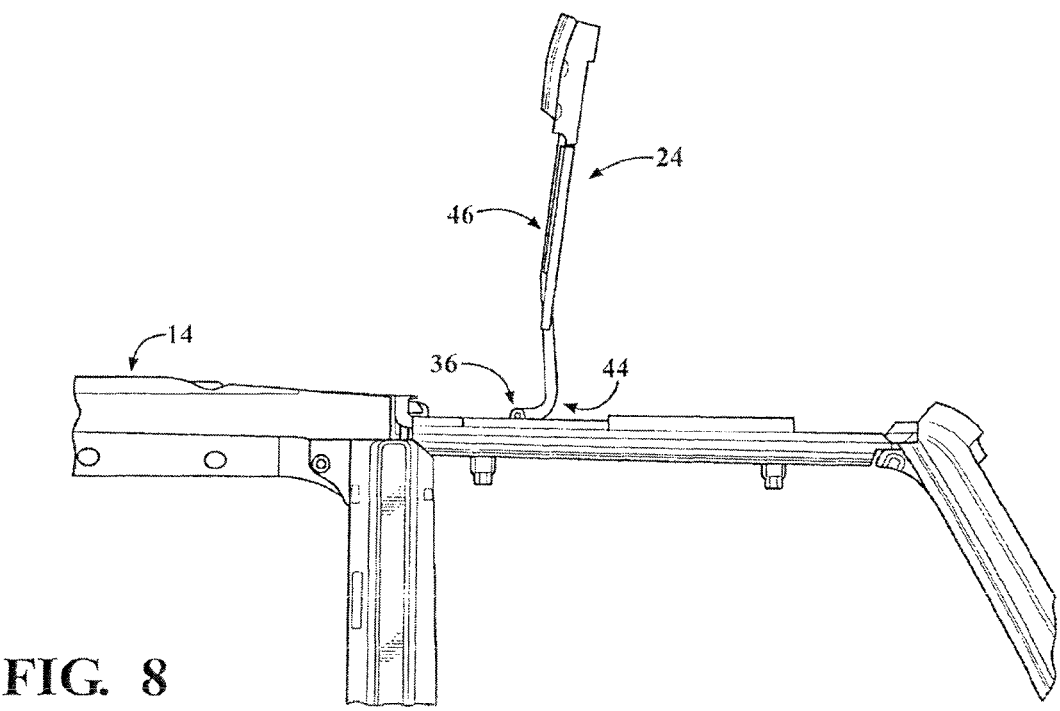
FIG. 8 is a right side elevation view of the soft panel top cover assembly in a partially open position, without the soft cover depicted for clarity, in accordance with the present invention.
Figure 9:
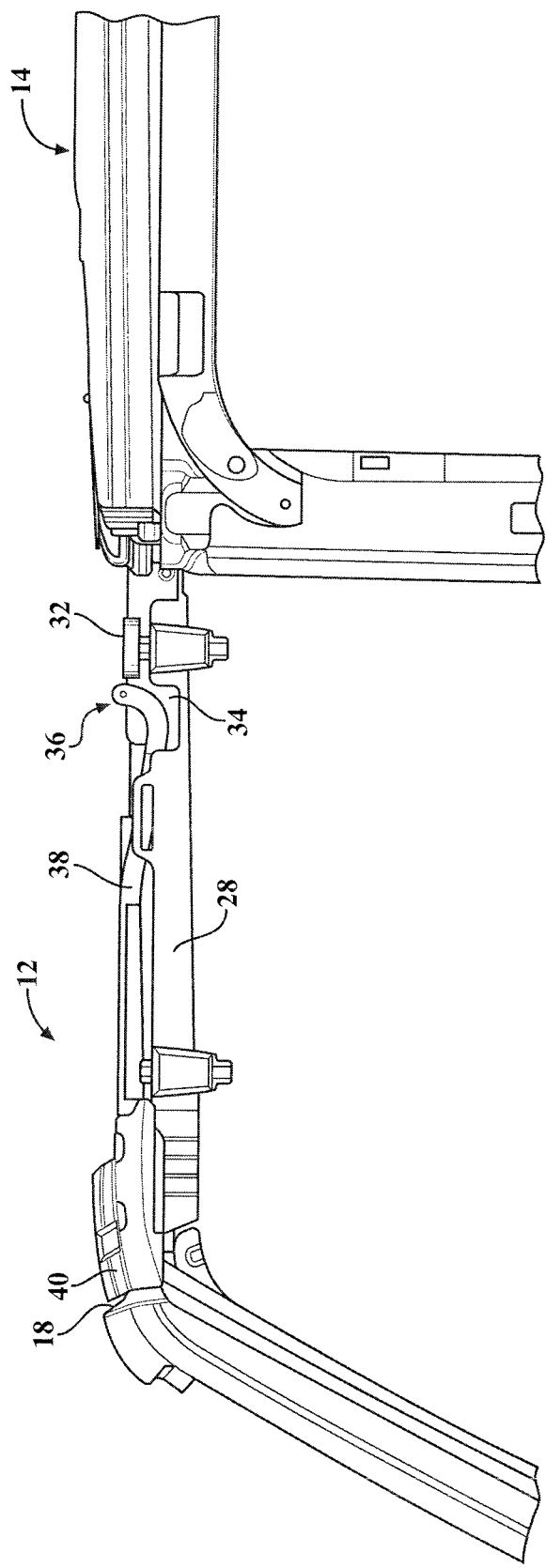
FIG. 9 is a side elevation view from the interior side of the soft panel top cover assembly of FIG. 6 in the closed position, without the soft cover and side member, e.g. sport bar depicted for clarity, in accordance with the present invention.
Figure 10:
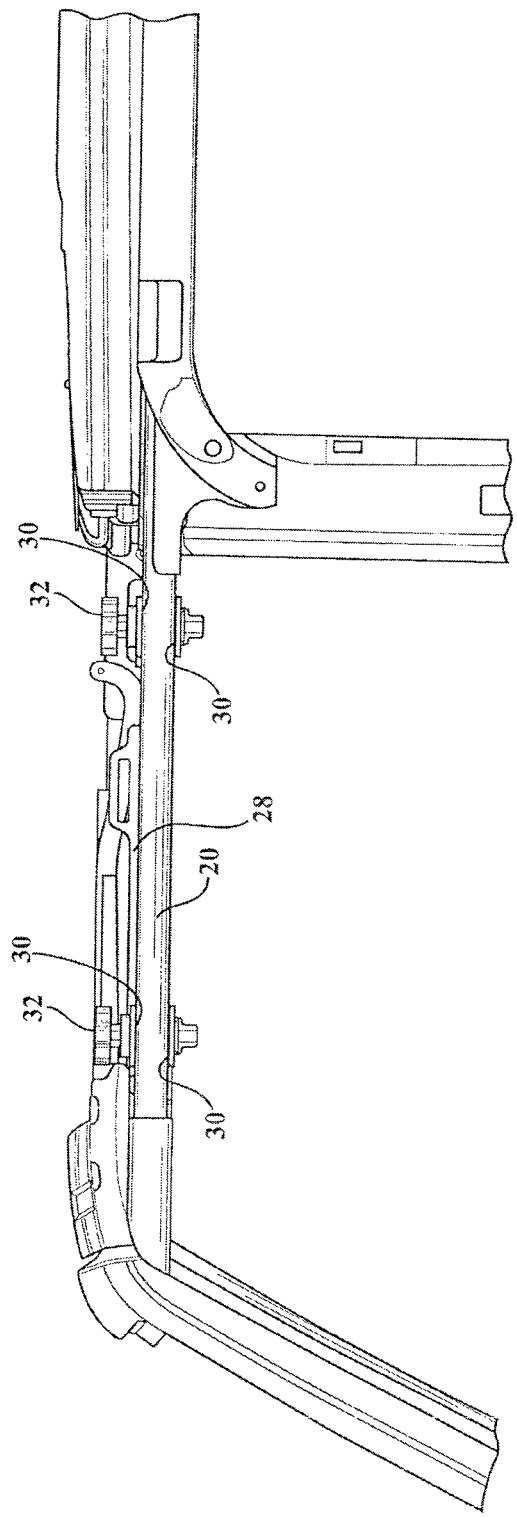
FIG. 10 is a side elevation view from the interior side of the soft panel top cover assembly of FIG. 9 in the closed position, without the soft cover depicted for clarity, in accordance with the present invention.

The rear header 52 is secured in place with a plurality of fasteners 58. At least two fasteners 58, preferably, mushroom knobs, secure the rear header 52 and the hard top portion 14 to the cross member 22 of the vehicle 16. At least two additional fasteners 58, preferably, mushroom knobs, clamp the outer edges of the rear header 52 in place. FIG. 4 depicts a knob 58 clamped against the bottom surface of the cross member 22 and having a pin portion extending through the cross member 22 and through an aperture in the attachment bracket 56 of the rear header 52. As both knobs 58 are tightened and screwed into the cross member 22 of the vehicle 16, the knobs 54 help press the rear header 52 against the hard top cover seals 54 of the hard top portion 14.

The left half of the soft panel top cover assembly 12 and corresponding features are substantially mirror image/symmetrical to the right half of the soft panel top cover assembly 12 and corresponding features depicted in the figures.

A two door vehicle is depicted in FIG. 1. It is understood that the present invention is additionally suitable for a four door vehicle.

By utilizing the pivot points attached to the door rails this allows the operator to quickly cycle the top from the closed position to the open sunroof position without removing the top. The operator would then be able to cycle the top from the open position to the closed position and latch the top just as easily. The operator does not need to leave the vehicle in order to operate the top. The whole top is made lightweight by using the wireframe rear header and by using minimal frame and mostly soft goods. This helps with ease of installation and ease of cycle efforts. The soft panel top assembly enables the occupant to fold the top back to gain an open air experience without removing the top and can mount to the hardtop without modification to the vehicle. The soft panel top assembly has significant benefits over typical removable hard top cockpit panels and does not require modification to the vehicle or hard top roof portion in any way.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A panel top assembly for a vehicle having a windshield frame with side members extending therefrom and a cross member connecting said side members adjacent to the rear of a front cockpit of said vehicle, said panel top assembly comprising:
   two door rails attached to said side members of said vehicle;
   two side rails pivotally connected to said at least two door rails;
   a first bow member connected between said two side rails and adapted to selectively connect to said windshield frame;
   a roof top opening cover, said cover connected to at least said first bow member wherein pivoting said two side rails allows said cover to move between a closed position and an open position; and
   a rear header member adapted to connect to said cover and to connect to said cross member, wherein said rear header member is in engagement with a hard top roof portion.

2. The panel top assembly of claim 1, further comprising at least two extrusions each connected to a respective one of said two side rails, wherein said cover is connectable to said at least two extrusions.

3. The panel top assembly of claim 1, further comprising two brackets, wherein a respective one of said brackets are each connected to a respective one of said two door rails to provide at least one pivot point on each of said two door rails.

4. The panel top assembly of claim 3, wherein said pivot points are provided with a bushing and screw arrangement allowing for the pivotal connection between each of said two brackets and said two side rails, such that said two side rails are pivotal about each pivot point.

5. The panel top assembly of claim 1, wherein said two door rails further comprises a plurality of clamping surfaces extending toward the vehicle interior for connecting each of said two door rails to a respective one of said side members of said vehicle using at least two fasteners.

6. The panel top assembly of claim 1, wherein the two side rails and first bow member pivot with a portion of said cover between said closed position and said open position to provide an open air feel of the panel top assembly without completely removing the panel top assembly from said vehicle.

7. The panel top assembly of claim 1, wherein the two door rails each extend between an A-pillar and a B-pillar of said vehicle.

8. The panel top assembly of claim 1, wherein said front edge of said cover is secured to said first bow member, and covers at least an outward portion of said first bow member when connected to said windshield frame.

9. The panel top assembly of claim 1, wherein said cover is secured to said rear header member and covers at least an outward portion of said rear header member.

10. The panel top assembly of claim 1, wherein said rear header member further comprises at least two attachment brackets for connecting said cross member of said vehicle to said rear header member using at least two fasteners.

11. The panel top assembly of claim 10, wherein said at least two fasteners are knob type fasteners and as said knobs are tightened against a bottom surface of said cross member said rear header member is pressed against seals between said rear header and said hard top roof portion.

12. A panel top assembly for a vehicle, comprising:
    two door rails attached to side members of said vehicle;
    two brackets, wherein a respective one of said brackets are each connected to a respective one of said two door rails;
    two side rails pivotally connected to said at least two door rails wherein a respective one of said brackets connects each side rail to each door rail creating at least one pivot point on each of said two door rails;
    a first bow member connected to said two side rails and adapted to selectively connect to a windshield frame;
    a roof top opening cover, said cover connected to said first bow member, wherein pivoting said two side rails about said pivot points moves said cover between a closed position and an open position; and
    a rear header member that is adapted to connect to said cover, wherein said rear header member is in engagement with a hard top roof portion.

13. The panel top assembly of claim 12, further comprising at least two extrusions connected to a respective one of said two side rails, wherein side edges of said cover are connectable to said at least two extrusions.

14. The panel top assembly of claim 13, wherein said cover is sewn to said at least two extrusions.

15. The panel top assembly of claim 12, wherein said pivot points are provided with a bushing and screw arrangement allowing for the pivotal connection between each of said two brackets and each of said two side rails, such that each one of said two side rails are pivotal about each respective one of said pivot points.

16. The panel top assembly of claim 12, wherein said two door rails further comprises a plurality of clamping surfaces extending toward the vehicle interior for connecting each of said two door rails to a respective one of said side members of said vehicle using at least two fasteners.

17. The panel top assembly of claim 12, wherein the two side rails and first bow member pivot with a portion of said cover between said closed position and said open position to provide an open air feel of the panel top assembly without completely removing the panel top assembly from said vehicle and without an operator exiting the vehicle to deploy or open the panel top assembly.

18. The panel top assembly of claim 12, wherein said rear header member further comprises at least two attachment brackets for connecting said cross member of said vehicle to said rear header member using at least two fasteners, wherein said at least two fasteners are tightened against a bottom surface of said cross member causing said rear header member to press against said hard top roof portion.

19. A panel top assembly for a vehicle having a windshield frame with side members extending therefrom and a cross member connecting said side members adjacent to the rear of a front cockpit of said vehicle, said panel top assembly comprising:
   two door rails attached to said side members of said vehicle;
   two brackets, wherein a respective one of said brackets are each connected to a respective one of said two door rails;
   two side rails pivotally connected to said at least two door rails wherein a respective one of said brackets connects each side rail to each door rail creating at least one pivot point on each of said two door rails;
   a first bow member connected between said two side rails and adapted to selectively connect to said windshield frame;
   a roof top opening cover, said cover connected to said first bow member, wherein the pivot points create a pivotal portion comprising said two side rails and said first bow member where pivoting said two side rails about said pivot points moves said cover between a deployed position and an open position; and
   a rear header member adapted to connect to a top surface of said cross member, wherein the shape and connection of said rear header member to said cross member brings said rear header member into engagement with a hard top roof portion.

* * * * *